July 16, 1929.  S. E. JOHNSON  1,721,156

ELECTRIC CONTACTING DEVICE FOR RAILWAYS

Filed Feb. 19, 1925

INVENTOR
Samuel E. Johnson
BY John L. Milton
ATTORNEY

Patented July 16, 1929.

1,721,156

UNITED STATES PATENT OFFICE.

SAMUEL E. JOHNSON, OF WHEATON, ILLINOIS.

ELECTRIC CONTACTING DEVICE FOR RAILWAYS.

Application filed February 19, 1925. Serial No. 10,331.

The object of my invention is to improve wheel operated contacting devices so as to make them reliable through all kinds of extreme conditions which are encountered when they are mounted adjacent the tracks; also to improve the nature and construction of the device, which object is accomplished by my invention, an embodiment of which is hereinafter more particularly set forth.

For a more detailed description, reference is to be had to the accompanying drawings forming a part hereof, in which—

Figure 1:
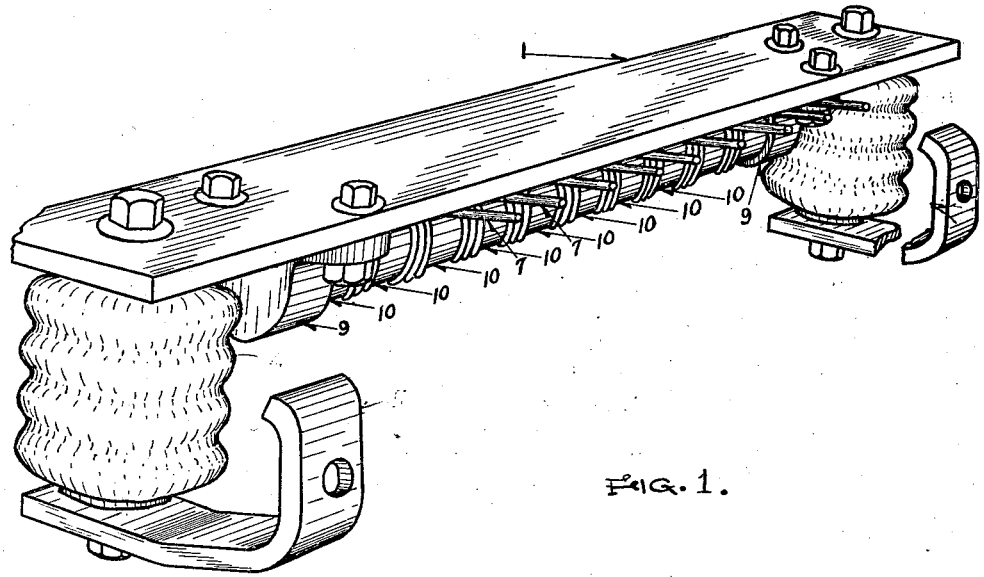
Figure 2:
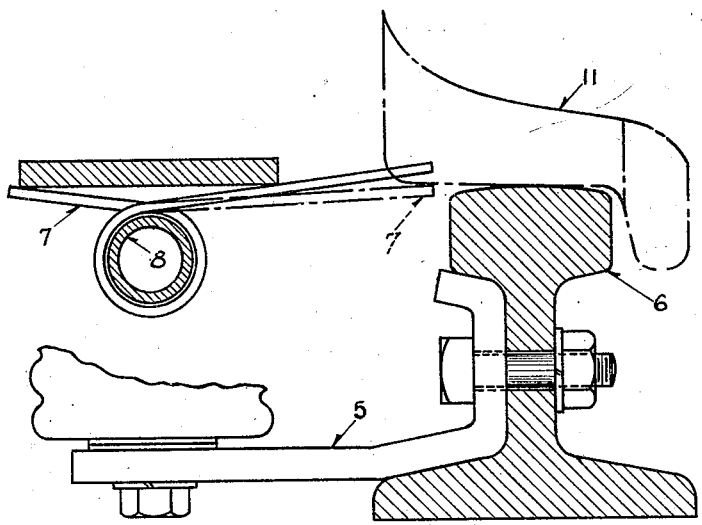

Fig. 1 is a perspective view of one form of the device; Fig. 2 is a cross-sectional view of a rail showing a supporting member of the device attached thereto; also a cross-sectional view of the top plate with a spring in full lines, and a depressed spring in dotted lines, also a section of a car wheel in dotted line.

Numeral 1 illustrates a metallic plate with a series of springs 7—7 attached thereto. Plate 1 is rigidly secured to insulators 4—4, which are secured to brackets 5—5, which are in turn bolted to track 6.

A construction is employed using a series of torsional springs 7—7 mounted on a shaft 8, which is supported in brackets 9—9, with locating and spacing collars 10—10.

As car wheel 11, shown in Fig. 2, in the course of its travel comes to the contactor, which is adjacent said rail, a succession of contacts is produced. The resiliency of springs 3 permits the contacting ends to momentarily depress, and then return to normal after the wheel has passed. In this course of passage, an electric circuit has been established between insulated metallic portions of the contactor and the ground side of the circuit.

Attention is called to the fact that this improved contactor will not be affected by snow, ice, rains, or any weather conditions, and that it is inherently protected from unauthorized tampering. Many practical applications have proven this device to be practically infallible.

While I have shown a practical embodiment of my invention, many other interpretations are possible without departing from the spirit of the invention, and I do not wish to limit myself beyond the claims appended hereto.

What I claim is:

1. In an electric signaling apparatus, including a circuit, in combination with a track and a metal wheeled vehicle operating thereon, a resilient circuit closing mechanism, consisting of a series of torsional springs mounted on a common shaft, and so constructed and located adjacent said track that the passing of said vehicle thereon will complete an electric circuit for the signal apparatus through said resilient means, said tracks, and the metal wheels of said vehicle.

2. In a railway electric signaling track contactor, in combination with a track and a metal wheel operating thereon, said contactor comprising a torsional spring mounted thereon by means of a shaft and bearings for said shaft, said bearings being mounted on a member which acts as a stop for holding said spring in a predetermined position when at rest.

SAMUEL E. JOHNSON.